April 15, 1924.
R. C. SCHEMMEL
WELT AND PROCESS OF MAKING SAME
Filed Nov. 25, 1922
1,490,856
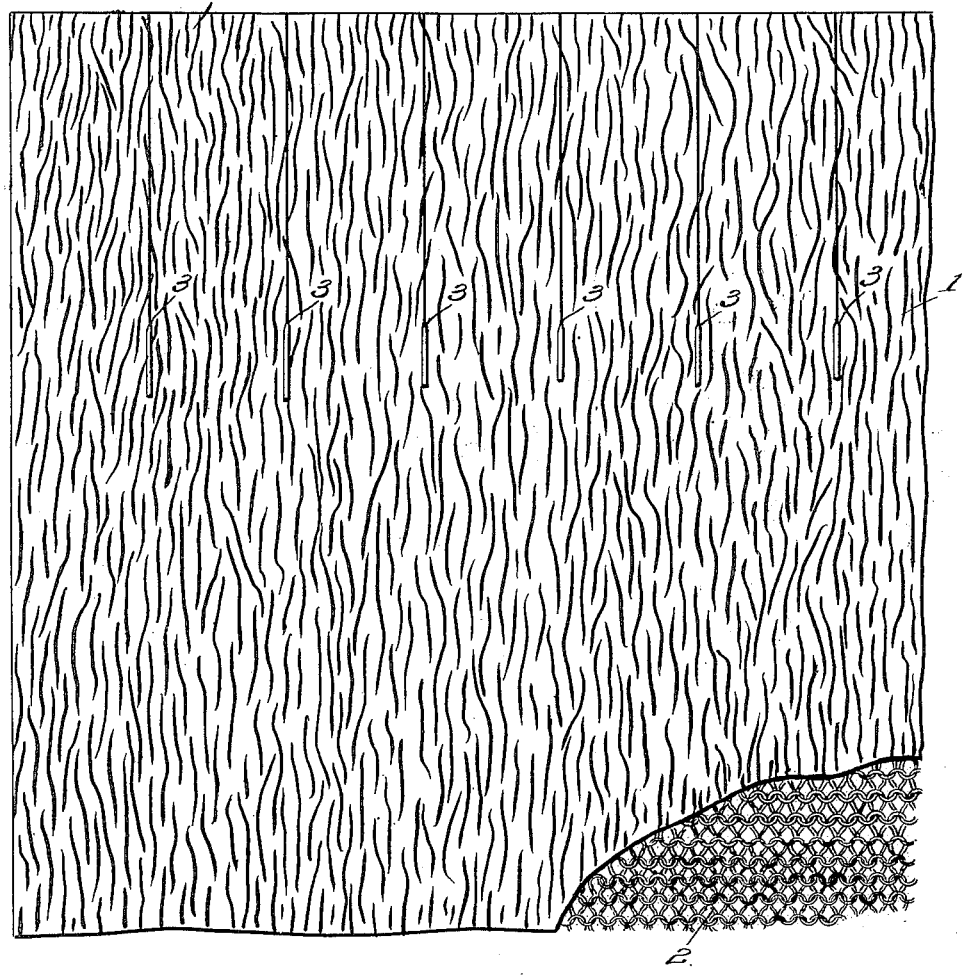
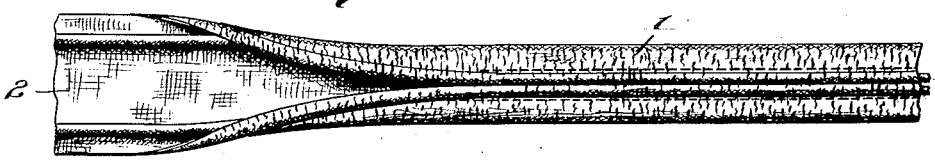
Inventor
Robert C. Schemmel,
By M. E. Dyre
His Attorney Patented Apr. 15, 1924.

1,490,856

UNITED STATES PATENT OFFICE.

ROBERT C. SCHEMMEL, OF UNION CITY, INDIANA, ASSIGNOR TO THE BACKSTAY MACHINE & LEATHER COMPANY, OF UNION CITY, INDIANA, A CORPORATION OF INDIANA.

WELT AND PROCESS OF MAKING SAME.

Application filed November 25, 1922. Serial No. 603,378.

*To all whom it may concern:*

Be it known that I, ROBERT C. SCHEMMEL, a citizen of the United States, residing at Union City, in the county of Randolph and State of Indiana, have invented certain new and useful Improvements in Welts and Processes of Making Same; and I do hereby declare the following to be a full, clear, and exact description of the invention, such as will enable others skilled in the art to which it appertains to make and use the same.

Welts, gimps, and bindings for trimming automobiles, other vehicles and furniture, have long been manufactured from leather, imitation leather, and various woven fabrics according to requirements. Regardless of the material employed however, it is always important that the finished article, such for example as the trimming welt forming the subject-matter of U. S. Letters Patent No. 1,226,600, issued to me under date of May 15, 1917, be possessed of as much flexibility as possible in lateral directions as well as longitudinally.

When made of fabrics, or imitation leather having a flat-laid woven fabric as its base, this lateral or sidewise flexibility has heretofore been obtained by first cutting fabric strips of proper width from the bolt in an angular direction, or upon a bias with respect to the direction of the warp and weft threads of which such woven fabric is composed. If cut longitudinally of the bolt it is obvious that the resulting strips of material would be of great length but devoid of stretch, because any strain imparted to the strip longitudinally would be directly along the warp, or longitudinal threads of the fabric, which would break before they could be stretched perceptibly.

Accordingly, it has heretofore been customary with manufacturers of welts, gimps and bindings made in imitation of leather having a woven fabric base, to first cut strips of material from the bolt at an angle of about forty-five degrees, and from these bias strips to form by folding, cording, or otherwise, the finished product. Such individual strips however, are necessarily of comparatively short length depending upon the width of the bolt of goods from which cut, thus necessitating frequent end splices which are objectionable, and often appear at conspicuous places when the welt is finally applied in use. When so formed of bias material, however, there is as a result, a perceptible stretch to the finished article, and also, what is even more important, a lateral flexibility as the relation of the warp and weft threads may be changed under pressure. In applying flat welts, gimps and bindings to the trim of automobiles for example, it is quite obvious that they adjust themselves readily to curved surfaces so long as located in the same vertical plane, but when applied to curved surfaces in different horizontal planes, that is to say, when it becomes necessary for the trimmer to flex the welt laterally, to the right or to the left of its longitudinal axis, there is great liability of puckering the welt at such points of turning, depending somewhat upon abruptness of the turn.

To overcome such puckering or kinking, and to insure a smooth finish, gave rise to the practice of forming welts, gimps and bindings from materials cut on the bias as aforesaid. This also is the prime object of my present invention, which has for another object that of materially increasing the pliability and flexibility both laterally and longitudinally, of trimming welts, gimps and bindings, and of facilitating the application thereof in continuous lengths to automobile trimming and other uses.

To these ends I have invented and discovered what I believe to be a new article of commerce, comprising what is hereinafter termed a welt-cloth, having certain novel characteristics; as also a novel method of making welts, gimps and bindings in imitation of leather from such welt cloth.

With the foregoing and other objects in view, the present invention will be hereinafter particularly set forth and then pointed out in the claims following.

Figure 1 represents in plan a fragment of welt-cloth for the manufacture of finishing welts, embodying my present invention, disclosing diagrammatically, at one corner, a small portion of the knitted base or body material in its original form not yet treated with leatherizing compounds, and indicating the method of stripping the finished product into welt blanks;

Figure 2 is a view also in plan, showing a strip of material cut from the welt cloth aforesaid, and at one end formed into a short section of finishing welt.

Reference being had to the drawing and numerals thereon, 1 indicates a small fragment of fabric which is loosely knitted as at 2, or formed of a multiplicity of interlocking loops, as distinguished from the hard laid woven fabric of warp and weft strands, heretofore used as a base material in the manufacture of imitation leather and leather substitutes.

In practicing my present invention this more or less loosely knitted base 2 is first formed in great lengths, either on a circular or straight knitting machine; if upon a circular machine, the product is next cut longitudinally and flattened. It is then treated by any of the well known compounds for making imitation leather, such for example as nitrocellulose and oil applied in successive coats, these coats being successively dried, and the last containing but little or no oil. The product may be calendered after each of said coats or applications, or after the final one only, and is then embossed to imitate the desired grain or finish. There are various oiling compounds at present used for treating woven fabrics as distinguished from knitted, to produce imitation leather, any one of which compounds may be employed in carrying out the present invention, but in any event the coatings aforesaid must be intimately united with, or anchored to the base of fabric whether woven as heretofore or knitted in accordance with my invention.

It will be seen at a glance that a knitted base of fabric is peculiarly permeable, also far more flexible and pliable than a woven base. This degree of flexibility in a knitted product, may also be predetermined by closeness or compactness of the loops, and stiffness of the sizing employed, but in any event such knitted and flattened base is impregnated with a suitable compound sufficiently fluid to permeate to such a depth beneath the surface as to obtain a firm anchorage within the substance of the base itself. Compound coatings such as aforesaid are then applied successively, each having a lesser degree of fluidity, until a surface having the requisite body has been obtained, as indicated at 1 upon the drawings forming part of this application. This surface 1 is then embossed, grained, or configured in imitation of various leathers, by passing same through suitable rolls or otherwise producing the desired surface configuration.

The bolt of goods produced and treated substantially as aforesaid, in any desired length, as then cut longitudinally as indicated diagrammatically at 3, Figure 1, into unbroken strips of suitable width and great length without the necessity of splicing. These strips are then formed as indicated by Figure 2 for example into welts, gimps and bindings of any approved form and by any approved means or method steps, such as those implied by my aforesaid Letters Patent No. 1,226,600, for example, and when so formed it will be noted that a welt has been produced which is peculiarly pliable longitudinally as well as laterally, thereby making it possible for the trimmer to neatly turn short corners, without liability of puckering or kinking the welt at such turning points. By this means also the necessity of splicing welts at frequent intervals is entirely eliminated, and the finished product is otherwise materially improved.

The foregoing being a description of my invention in one form of embodiment, it should be noted that I do not limit myself to the exact product set forth, nor to the method steps enumerated, but on the contrary lay claim to all methods of producing welts, gimps and bindings in imitation of leather, having a knitted base, or a base of interlocking loops substantially as described.

Neither do I consider this invention limited in its scope and usefulness to the manufacture of welts, gimps and bindings, but on the contrary claim all uses to which my improved welt-cloth can be applied, as for example, that of building automobile tires, or the manufacture of outer removable covers for spare tires, in connection with both of which articles it is necessary to employ a fabric capable of stretching to form over circular and curved surfaces.

Having thus described my present invention what I now claim and desire to secure by Letters Patent is:

1. As an article of manufacture a finishing welt formed from a knitted and suitably stiffened welt-cloth.

2. As an article of manufacture a finishing welt formed from a knitted welt-cloth impregnated with a suitable stiffening compound.

3. As an article of manufacture a finishing welt in imitation of leather formed from a stretchable knitted welt-cloth having a base of interlocking loops.

4. The method of making finishing welts which consists of forming a knitted base of interlocking loops, impregnating said base with a stiffening solution, cutting the impregnated base into longitudinal strips, and forming said strips into welts.

5. The method of making finishing welts which consists of forming a knitted base of interlocking loops and of predetermined tension, impregnating said base with a suitable imitation leather compound, cutting said base into continuous longitudinal strips, and forming said strips into welts.

In testimony whereof I affix my signature, in presence of two subscribing witnesses.

ROBERT C. SCHEMMEL.

Witnesses:
GLEN G. BARR,
E. I. LIPP.